Figure 1:
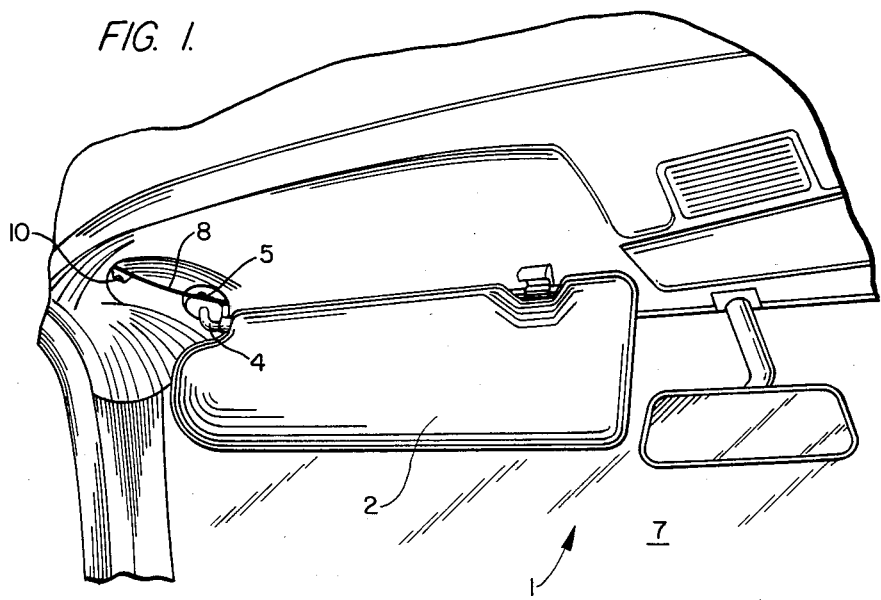

United States Patent [19]

Gmeiner et al.

[11] Patent Number: 4,570,989
[45] Date of Patent: Feb. 18, 1986

[54] SUN VISOR FOR VEHICLES PROVIDED WITH A PROTECTIVE SUN VISOR PLATE

[75] Inventors: Günter Gmeiner; William Hugger, both of Sindelfingen; Rudolf Binder, Schoenaich, all of Fed. Rep. of Germany

[73] Assignee: Daimler-Benz Aktiengesellschaft, Fed. Rep. of Germany

[21] Appl. No.: 560,406

[22] Filed: Dec. 12, 1983

[30] Foreign Application Priority Data

Dec. 18, 1982 [DE] Fed. Rep. of Germany ....... 3246941

[51] Int. Cl.$^4$ ............................................... B60J 3/00
[52] U.S. Cl. .................................. 296/97 J; 296/97 R; 296/97 G; 296/97 K; 296/97 C
[58] Field of Search ................ 296/97 R, 97 C, 97 G, 296/97 H, 97 J, 97 K, 97 B, 97 D, 97 F; 160/DIG. 3

[56] References Cited

U.S. PATENT DOCUMENTS

| | | | |
|---|---|---|---|
| 1,429,034 | 9/1922 | Haseltine | 296/97 J |
| 1,698,246 | 1/1929 | Stark | 160/DIG. 3 |
| 2,207,668 | 7/1940 | Hudgings | 296/97 K |
| 2,220,429 | 11/1940 | Soderberg | 160/DIG. 3 |
| 3,032,371 | 5/1962 | Berridge et al. | 296/97 K |
| 3,095,233 | 6/1963 | Dryden | 296/97 K |
| 3,333,887 | 8/1967 | Dryden | 296/97 R |
| 3,556,585 | 1/1971 | Binden | 296/97 K |

FOREIGN PATENT DOCUMENTS

| | | | |
|---|---|---|---|
| 810346 | 8/1951 | Fed. Rep. of Germany | 296/97 J |
| 149599 | 10/1931 | Switzerland | 296/97 J |

*Primary Examiner*—Robert B. Reeves
*Assistant Examiner*—Russell D. Stormer
*Attorney, Agent, or Firm*—Craig & Burns

[57] ABSTRACT

A sun visor provided with a protective sun visor plate for the windshield of a vehicle whose protective sun visor plate is pivotally and axially displaceably supported on a horizontal mounting rod whereby the mounting rod is pivotally retained in a fixed bearing support about an approximately vertical axis by way of an angularly bent area; in order to obviate a separate displacement of the sun visor into its optimum axial position, when pivoting the sun visor in front of the window of the coordinated side door, provision is made according to the present invention that a lever which, on the one hand, is operatively connected with the protective sun visor plate and, on the other hand, is pivotally secured at the vehicle, is so arranged that during the pivoting of the mounting rod about the approximately vertical axis, an axial displacement of the protective sun visor plate on the mounting rod is automatically effected.

3 Claims, 2 Drawing Figures

U.S. Patent

Feb. 18, 1986

4,570,989

SUN VISOR FOR VEHICLES PROVIDED WITH A PROTECTIVE SUN VISOR PLATE

The present invention relates to a sun visor having a protective sun visor plate for the windshield of a vehicle, whose protective sun visor plate is supported pivotally and displaceably in the axial direction on an essentially horizontal mounting rod, whereby the mounting rod is pivotally retained in a fixed bearing support about an approximately vertical axis by means of an angularly bent end area.

Such types of sun visors are customarily secured ahead of the driver and passenger seat within the area above the windshield. However, they can also be pivoted in front of the window of the respectively associated side door in case of a strong lateral light incidence whereby it is frequently necessary to displace the protective sun visor plate rearwardly opposite the driving direction in order to obtain an optimum sun visor protection.

The present invention is concerned with the task to provide a possibility to bring the protective sun visor plate, already immediately when pivoting the sun visor toward the side, into a position favorable for the respective vehicle type so as to keep as small as possible the distraction especially for the driver of the vehicle.

The underlying problems are solved according to the present invention with a sun visor of the type described hereinabove in that a lever is provided operatively connected, on the one hand, with the protective sun visor plate and, on the other hand, pivotally secured at the vehicle, which during the deflection of the mounting rod about the approximately vertical axis effects an axial displacement of the protective sun visor plate on the mounting rod.

Figure 2:
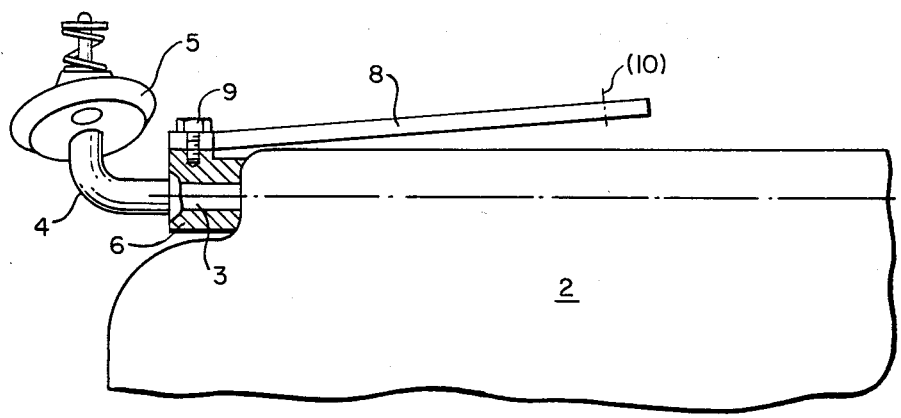

These and other objects, features and advantages of the present invention will become more apparent from the following description when taken in connection with the accompanying drawing which shows, for purposes of illustration only, one embodiment in accordance with the present invention, and wherein:

FIG. 1 is a perspective view of a sun visor in accordance with the present invention mounted on the left vehicle side, in its position pivoted down against the windshield; and FIG. 2 is a schematic view, on an enlarged scale, of the mounting and fastening elements unattached to the vehicle and wherein the shifting lever is shown pivoted to a position over the sun visor.

Referring now to the drawing wherein like reference numerals are used throughout the two views to designate like parts, the sun visor generally designated by reference numeral 1 which is illustrated in the drawing, includes a protective sun visor plate 2 which is supported on a mounting rod 3 that is retained in a fixed bearing support 5 pivotal about an approximately vertical axis by means of an angularly bent end section 4 thereof. The protective sun visor plate 2 is thereby seated pivotally but axially nondisplaceably on an intermediate mounting support 6 which in turn is rotatably and axially displaceably supported on the mounting rod 3.

If this protective sun visor plate 2 is now swung from its position illustrated in FIG. 1 of the drawing in front of the windshield 7, into a position in front of the window of the left front side door (not shown), it is to be displaced at the same time on the mounting rod 3 toward the rear opposite the driving direction in order to obtain a suitable position at the side window of the door. This displacement takes place automatically by way of a lever 8 which, on the one hand, is pivotally secured at the intermediate mounting support 6 by way of a bolt 9 and, on the other hand, is pivotally secured at 10 fixed at the vehicle. This lever 8 is illustrated in FIG. 2 of the drawing in a position pivoted from its real position in the vehicle solely for space reasons in the drawing.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A sun visor having a protective sun visor plate for the windshield of a vehicle, said protective sun visor plate is pivotal and axially displaceable on an essentially horizontal mounting rod, and in which the mounting rod is retained by means of an angularly bent end section thereof in a fixed bearing support so as to be pivotal about an approximately vertical axis, characterized in that a lever is operatively and pivotally connected with the protective sun visor plate and pivotally secured at the vehicle, said lever being operable during pivoting of the mounting rod about the approximately vertical axis to bring about an axial displacement of the protective sun visor plate on the mounting rod.

2. A sun visor according to claim 1, characterized in that the lever is pivotally connected to an intermediate support means which is supported rotatably and axially displaceably on the mounting rod, the protective sun visor plate being pivotally but axially nondisplaceably arranged on the intermediate support means.

3. A sun visor according to claim 2, characterized in that the protective sun visor plate is arranged directly on the intermediate support means.

* * * * *